United States Patent [19]

Schmid et al.

[11] 3,866,477
[45] Feb. 18, 1975

[54] SINGLE KNOB, MULTIFUNCTION CONTROL ASSEMBLY FOR A TELEVISION RECEIVER

[75] Inventors: Richard G. Schmid, Glenview; Otto H. Schwartz, Rolling Meadows, both of Ill.

[73] Assignee: Zenith Radio Corporation, Chicago, Ill.

[22] Filed: Aug. 2, 1973

[21] Appl. No.: 384,877

[52] U.S. Cl. ............. 74/10.45, 74/10.41, 116/124.1, 192/48.8, 192/95
[51] Int. Cl. ...... H03j 1/04, F16d 21/00, F16h 35/18
[58] Field of Search ....... 74/10.41, 10.45; 192/48.8, 192/48.9, 95; 116/124.1

[56] References Cited
UNITED STATES PATENTS

| | | | |
|---|---|---|---|
| 1,598,146 | 8/1926 | McKenzie | 74/10.45 |
| 1,660,278 | 2/1928 | Schwarze, Jr. | 74/10.45 |
| 3,479,898 | 11/1969 | Prager | 74/10.45 X |

Primary Examiner—Allan D. Herrmann
Attorney, Agent, or Firm—Nicholas A. Camasto; John J. Pederson

[57] ABSTRACT

A control assembly for a television receiver includes a frame supporting a linear arrangement of resistive potentiometers and a track aligned therewith. A master shaft assembly, slidable along the track, bears a rotatable master shaft which is movable to tuning positions for engagement with the selected potentiometer. A spring, housed in the slider assembly biases the master shaft out of engagement, and a lamp, mounted to the master shaft assembly, illuminates appropriate control function indicators at each tuning position. A resilient foam curtain, having an elongated aperture through which the master shaft protrudes, is mounted to the frame.

In one of the disclosed embodiments the track has a series of depressions adjacent each tuning position and a pair of spring loaded detent balls on the master shaft assembly coacting with the depressions to index the master shaft assembly. A plate, having a plurality of chamfered holes, corresponding to the potentiometers, is interposed between the master shaft assembly and the potentiometers to provide a guide for the master shaft.

In the other disclosed embodiment a plate, having a plurality of valleys, corresponding to the potentiometers, and a hole at the bottom of each valley, is interposed between the potentiometers and the master shaft assembly. The surfaces of the valleys, when contacted by the master shaft, act to adjust the position of the master shaft assembly along the track and guide the master shaft into engagement with the potentiometers.

12 Claims, 6 Drawing Figures

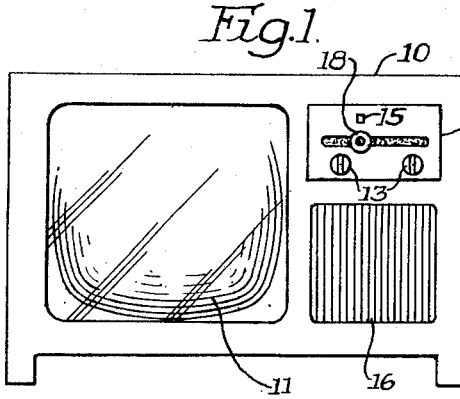
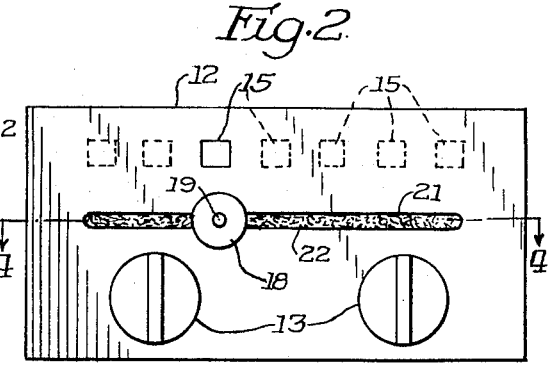
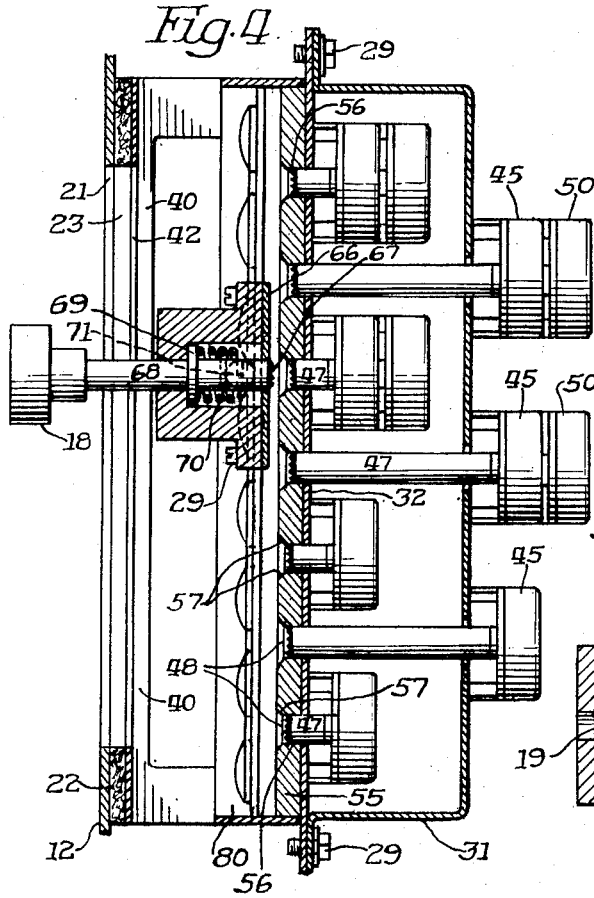
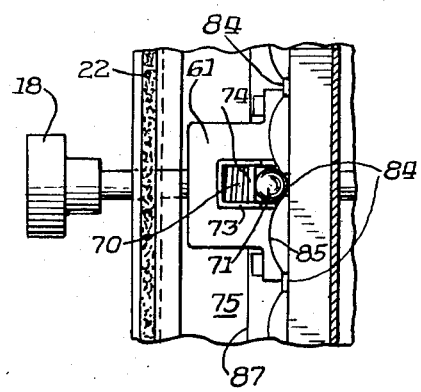
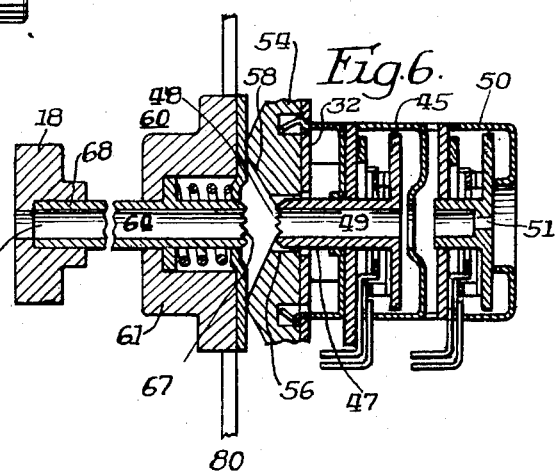

SINGLE KNOB, MULTIFUNCTION CONTROL ASSEMBLY FOR A TELEVISION RECEIVER

BACKGROUND OF THE INVENTION

Color television receivers require viewer adjustment of a large number of control functions, generally performed through resistive potentiometers. For example, color television receivers currently used typically have seven viewer adjustable potentiometers exclusive of channel selection apparatus.

Aesthetic considerations in the design of television cabinetry limit the amount of room which can be devoted to this array of potentiometers. In addition, the large number of potentiometers and accompanying function indicators frequently confuse the viewer resulting in misadjustment.

Present attempts by television manufacturers to minimize this confusion and aesthetic limitation include variations in the arrangement and size of knobs, multiple shaft controls having two or more concentric knobs, combinations of rotary and linear slide potentiometers, and variations of control function indicators.

OBJECTS OF THE INVENTION

Accordingly, it is an object of the disclosed invention to provide a color television receiver which is aesthetically pleasing.

It is a further object of the disclosed invention to provide a novel control assembly for a color television receiver which is easier and less confusing to adjust.

SUMMARY OF THE INVENTION

A television receiver control assembly has a linear array of viewer operable potentiometers, selectively adjustable by a single viewer operated master shaft. The linear array of potentiometers defines a plurality of tuning positions to which the master shaft, housed in a slidable master shaft assembly, can be moved. The master shaft, spring biased to a neutral position, is depressed by the viewer to engage and adjust the selected potentiometer.

In one embodiment the master shaft assembly is indexed, at the tuning positions, by a detent and the master shaft is guided, by chamfered access holes, into engagement with the selected potentiometer.

In the other embodiment the master shaft assembly is positioned by the interaction of the master shaft, when depressed, and interposed cam surfaces.

BRIEF DESCRIPTION OF THE DRAWINGS

The features of this invention which are believed to be novel are set forth with particularity in the appended claims. The invention, together with its further objects and advantages thereof, may best be understood, however, by reference to the following description taken in conjunction with the accompanying drawings, in which like reference numerals refer to like elements in the several figures and in which:

FIG. 1 shows a television receiver having a control assembly in accordance with the invention;

FIG. 2 is an enlarged view of the control assembly of FIG. 1;

FIG. 4 is an enlarged sectional view of FIG. 2 taken along lines 4—4;

FIG. 5 is another view of the detent mechanism of FIG. 4; and

FIG. 6 is a sectional depiction of a portion of the control assembly of FIG. 4 showing an alternate embodiment of the invention which does not require a detent mechanism.

DETAILED DESCRIPTION OF THE INVENTION

Figure 3:
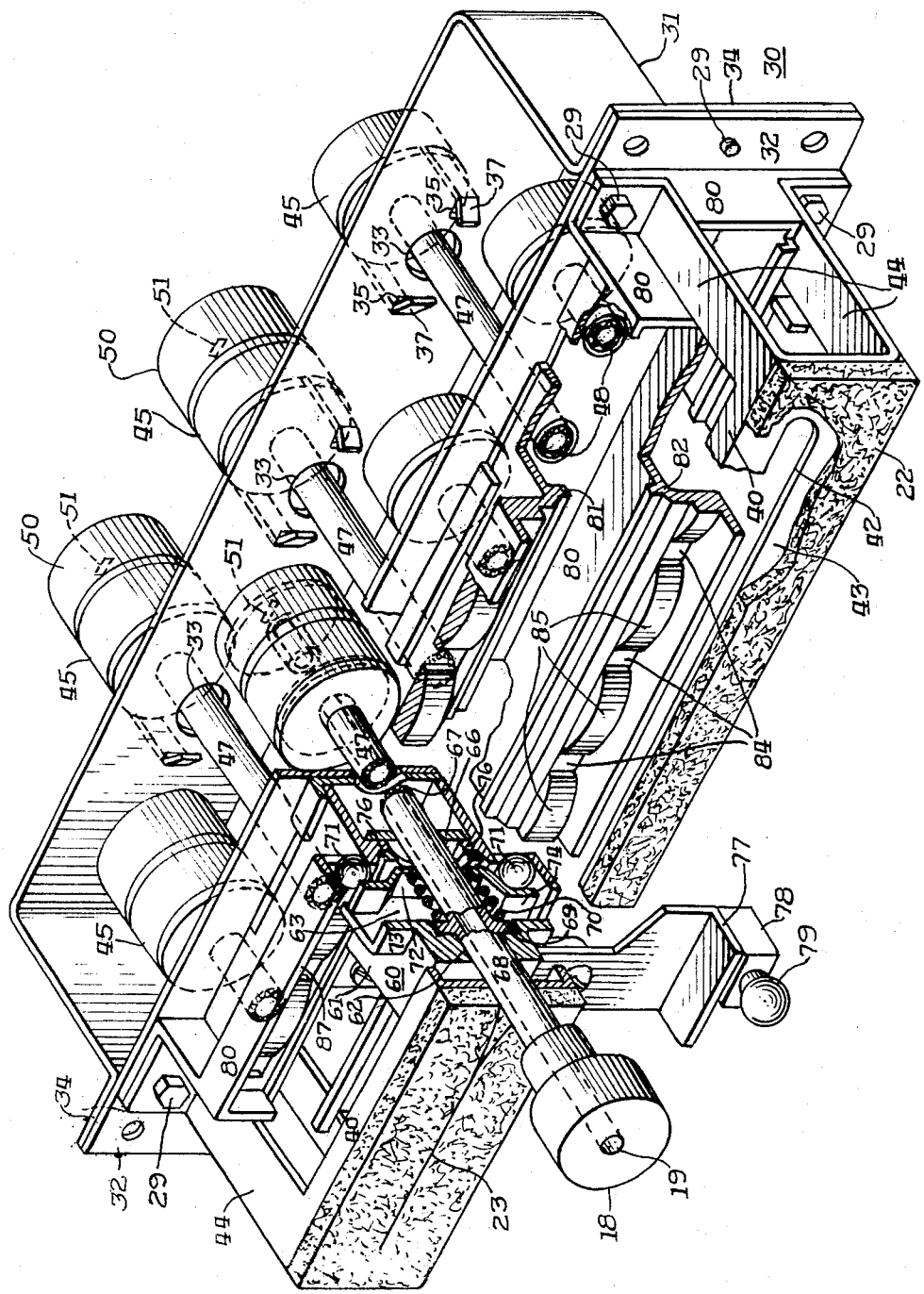
FIG. 3 is a perspective view showing the mechanical structure of the control assembly of the invention.

Referring to FIG. 1, a television receiver 10 includes a chassis (not shown) having circuitry well-known in the art for receiving and processing a television signal and displaying the video information thereon on a picture tube 11. Receiver 10 includes channel selection means 13 and circuitry (not shown) responsive to viewer adjustable potentiometers for controlling receiver functions such as audio, brightness, contrast, tone, etc. A color receiver will also include appropriate potentiometers for adjusting the saturation and tint of the displayed video information. A bezel 12 provides a decorative background for a master shaft knob 18, channel selection means 13 and function indicators 15. Master shaft knob 18 is movable to a number of tuning positions, each corresponding to a viewer adjustable control function indicated by a function indicator. A speaker grille 16 provides an overlay of acoustically transparent material aesthetically coordinated with receiver 10 for concealing the receiver speaker.

Control bezel 12, shown more clearly in FIG. 2, is preferably constructed of dark transparent plastic material. Function indicators 15 at each tuning position may comprise appropriate legends which are normally rendered invisible by the bezel. An invisible lamp is associated with knob 18 for illuminating the corresponding function indicator.

An elongated aperture 21 in bezel 12 permits linear movement of master shaft knob 18 to any of the tuning positions. In addition to the potentiometers adjustable by knob 18, there are "piggy-backed" potentiometers (not shown in this figure) whose nature will be discussed later. A center hole 19 in master shaft knob 18 provides access to such piggy-backed potentiometers. A foam curtain 22, positioned behind bezel 12, masks the inner structure of the control assembly, thereby maintaining the appearance of the receiver.

FIG. 3 shows a partially sectioned perspective view of the control assembly. A plurality of viewer adjustable potentiometers 45, each having an adjustable element 47, are mounted to a frame 30. Frame 30 is composed of three parts, a U-shaped bracket 31 having outwardly extending end flanges 34, a straight bracket 32 and a channel bracket 40. U-shaped bracket 31 includes a plurality of holes 33 through which the adjustable elements of the potentiometers extend. The potentiometers on bracket 31 are mounted by means of a pair of tabs 37 cooperating with a mating pair of mounting holes 35. Similar mounting arrangements (not shown for clarity) are used to mount the appropriate potentiometers to straight bracket 32. Brackets 31, 32 and 40 may be formed of metal, as shown, or alternately of any suitably rigid material. Bracket 31 is attached to bracket 32 by fastening means 29 at end flanges 34.

Potentiometers 45 are well-known in the art and each has a cylindrical adjustable element or shaft 47 coupled to a wiper arm which is movable over a resistance (not shown). As will be described later, each adjustable element 47 has a special end structure 48. The resistance is enclosed in a metal case which includes the mounting tabs 37 which mate with mounting holes 35 for attaching potentiometers 45 to brackets 31 and 32 in a staggered configuration. The staggered mounting of potentiometers 45 reduces the distance between their adjustable elements 47 and enables a more compact linear arrangement of control functions. As shown, the potentiometers mounted to bracket 31 are interleaved with those mounted to bracket 32. The potentiometers on bracket 31 are displaced to the rear of those mounted to bracket 32, and their adjustable elements 47 are correspondingly longer so all end structures 48 lie in a common plane. None of the wiring or electrical interconnections between potentiometers and receiver circuitry is shown for clarity.

For some control functions, a second piggy-backed potentiometer may be incorporated. For example, some color receivers incorporate color controls which simultaneously adjust different functions such as color and contrast. In general, however, piggy-backed potentiometers are used to simplify control panels for both design considerations and assembly purposes. The piggy-backed potentiometer is, therefore, usually unrelated to the function of the potentiometers to which it is attached and is generally accessible only by use of a special tool, after removal of the control knob. For example, the receiver horizontal and vertical controls may be piggy-backed to normally viewer adjustable controls such as volume and tone. In these cases, operation of the viewer adjustable controls has no effect on the piggy-backed ones and obviously there is no interconnection between their wipers. The piggy-backed potentiometer is attached to its viewer adjustable potentiometer, the adjustable element and case of which include aligned access holes.

It is also common practice to use a duplicate set of potentiometers for the functions of color level, tint, brightness, and contrast. These duplicate potentiometers are factory preset at optimum levels and are switched into the circuit by a viewer operated switch. These preset controls are serviceman adjustable and in the present embodiment, viewer adjustable with a special tool for presetting the duplicate potentiometers at desired levels. It is advantageous to attach the duplicate potentiometers to the viewer operated potentiometer of the same function. For example, if the duplicate color level potentiometer is piggy-backed upon the viewer operated potentiometer for color level, the movement of the master shaft to that tuning position will illuminate its function indicator. Such indication will then serve a double purpose indicating not only the control function adjustable but the duplicate potentiometer as well.

A track member 80, mounted between channel bracket 40 and straight bracket 32, and preferably molded of shock absorbent plastic material, includes a longitudinal track defined by an upper track rail 81 and a lower track rail 82. A series of detent depressions 84, positioned on each side of the track rails are arranged in pairs at the tuning positions. Substantially cylindrical offset surfaces 85 are interspersed between detent depressions 84 in each series.

A master shaft assembly 60 includes a master shaft housing 61, a hollow master shaft 68 having a collar 69, a bias spring 70, a ball retainer 72, a pair of captive detent balls 71 and a groove plate 66. A pair of parallel ridges 76 in the side of housing 61 together with a groove plate 66 attached to housing 61 by suitable means comprises a track follower. The surfaces of ridges 76 and the groove plate 66 together with track rails 81 and 82 comprise guide means which cooperate to confine master shaft assembly 60 to longitudinal movement along track member 80.

Housing 61 also defines a cylindrical perpendicular oriented bearing hole 62 and a larger cavity 63 concentric therewith extending from the approximate midpoint of housing 61 to groove plate 66. A pair of channels 73 (shown more clearly in FIG. 5) on the sides of housing 61 opposite those having parallel ridges 76 extends from the base of housing 61 perpendicular to the plane of ridges 76 and are connected to cavity 63. Channels 73 together with flanges 87 on track member 80 comprise the structure used to captivate detent balls 71. Master shaft 68 is movable both longitudinally and rotationally in bearing hole 62 and has an end structure 67 matingly engageable with the corresponding end structures 48 of adjustable elements 47. Collar 69, larger than bearing hole 62 but small enough to move within cavity 63, abuts the upper wall of the cavity and restricts longitudinal movement of master shaft 68.

Ball retainer 72, positioned in cavity 63, is an elongated metal structure having a center hole for the master shaft and offset end portions 74 extending out of cavity 63 into channels 73 on the sides of housing 61. Compression bias spring 70, interposed between collar 69 and ball retainer 72, encircles master shaft 68 and urges it to a position of non-engagement with adjustable elements 47. The force of spring 70 is also applied to ball retainer 72 forcing detent balls 71 into depressions 84 thereby indexing master shaft assembly 60 at the tuning positions.

As mentioned, channel bracket 40 is mounted to straight bracket 32 above track member 80 by support legs 44 on opposite ends of portion 43, which includes an elongated aperture 42 through which master shaft 68 protrudes. Foam curtain 22 is attached to and covers the surface of portion 43 and has a central slit 23 corresponding in length to aperture 42. The curtain readily separates to enable free movement of the master shaft, yet is sufficiently resilient to block the control assembly mechanism from view.

A lamp bracket 77 is attached to housing 61 and supports a lamp socket 78 and lamp 79. As discussed above, the lamp is movable with the master shaft assembly and illuminates the function indicator to indicate to the viewer the control function corresponding to the selected tuning position.

FIG. 4 shows the control assembly mounted to bezel 12. As in FIG. 3, all electrical connections have been omitted for clarity. Foam curtain 22, interposed between bezel 12 and channel bracket 40, is compressed during the mounting. As discussed above, master shaft 68 extends through aperture 42 in the channel bracket, slit 23 in the curtain and aperture 21 in the bezel for a sufficient distance to permit mounting of knob 18. The compression of foam curtain 22 assists in closure of slit 23 therein thereby masking the control assembly structure from view.

A positioning means comprising a plate 55 having a plurality of access holes 56 each having chamfers 57 is interposed between track member 80 and bracket 32. Plate 55 is so positioned that adjustable elements 47 extend into access holes 56 and the common plate defined by their end structures 48 lies just below chamfers 57. As will be discussed later, chamfers 57 assist in alignment of the master shaft and adjustable element.

In operation, the control function to be adjusted is selected by sliding knob 18 (and master shaft assembly 60) to the appropriate position as indicated by illumination of the corresponding function indicator. When so positioned the master shaft is aligned with the adjustable element of the selected one of the potentiometers. Depression of the knob moves the master shaft (against the urging of bias spring 70) into the corresponding access hole and into engagement with the adjustable element. Rotation of knob 18 rotates the adjustable element of the selected one of the potentiometers thereby adjusting the selected control function.

As discussed above, the movement of master shaft assembly 60 is indexed at each tuning position, that is, at positions corresponding to the control functions. Indexing is accomplished by detent 75 (shown more clearly in FIG. 5) composed of captive balls 71, ball retainer 72 whose end portion 74 is visible in FIG. 5, bias spring 70 and detent depressions 84. The detent depressions correspond to the tuning positions and are separated by cylindrical offset surfaces 85 on track member 80. At the tuning positions, spring 70 and ball retainer 72 force captive balls 71 into detent depressions 84 for "seating" of the master shaft assembly. Movement of the master shaft assembly between tuning positions displaces the captive balls from the detent depressions and onto the offset surfaces. The "hill and dale" course defining the tuning positions manifests itself in a similar variation in "feel" or to operator discerned difference in required moving force. A strong spring will produce positive seating, but be unattractive from the user standpoint, whereas a weak detent is desirable, but not conducive to accuracy of master shaft positioning. The embodiment described above incorporates a fairly light detent action (weak spring) for imparting reasonable degree of "feel" to the user for performing a close, but not necessarily exact alignment of the master shaft and adjustable element in any given tuning position. Exact alignment is achieved by the action of the chamfer surface 57 on the access holes and coacting means, comprising end structure 67 (shown in FIG. 4), during depression of master shaft 68. The inclined surface of chamfer 57 cams master shaft end structure 67 into alignment with end structure 48. This is a preferred construction for the invention.

An alternate arrangement of structure for carrying out the inventive concept is shown in FIG. 6. Also shown are the details of the arrangement of piggy-backed potentiometers 50 which may be adjusted by positioning the master shaft assembly at the appropriate control function position. When so positioned, hole 19 in master shaft knob 18, hole 64 in master shaft 68 and hole 49 in adjustable element 47 are aligned and permit insertion of an appropriate adjustment tool for adjusting the selected piggy-backed potentiometer. A socket 51 suitably shaped for mating with the adjustment tool is used for driving the wiper of the potentiometer 50. Obviously, the adjustment tool is removed after the adjustment is made.

In the alternate embodiment, alignment of master shaft 68 and the selected one of adjustable elements 47 is accomplished solely by cooperation of the coacting means, comprising end structure 67, and a large cam surface 58. Potentiometers 45 are mounted in the same manner as discussed above. Similarly, master shaft housing 61 is movable along the track rails to any selected tuning position. Unlike the previously discussed structure, however, housing 61 is not indexed by a detent. Complete alignment of master shaft 68 at a selected tuning position is accomplished by the action of end structure 67 and the corresponding one of cam surfaces 58.

A positioning means or plate 54, interposed between straight bracket 32 and track member 80, defines a series of valleys (cam surfaces) each terminating in an access hole 56 at each tuning position. Adjustable elements 47 extend into access holes 56 such that their end structures 48 lie just below the intersection of access hole 56 and cam surface 58.

In operation master shaft assembly 60 is slidably moved to a position roughly corresponding to the desired tuning position. (Note that there is no variation in operator "feel.") Depression of master shaft 68 causes end structure 67 to contact cam surface 58 which displaces the master shaft into access hole 56 and into engagement with adjustable element 47. It will be readily perceived that a combination of the concepts in both embodiments may be used to produce an optimal degree of operator "feel."

The invention disclosed provides a television receiver with a single viewer operated control knob which is positioned to select any one of several viewer adjustable control functions. Once selected, the function is adjusted by a "push and turn" action. Unlike prior systems which used a number of control knobs in a too often confusing array, the disclosed arrangement clearly indicates the selected function at any tuning position and results in an aesthetically pleasing and less operationally confusing control assembly.

While a particular embodiment of the present invention has been shown and described, it will be obvious to those skilled in the art that various changes and modifications may be made without departing from the invention in its broader aspects. Accordingly, the aim in the appended claims is to cover all such changes and modifications that may fall within the true spirit and scope of the invention.

What is claimed is:

1. A television receiver having a control assembly including at least three viewer operable potentiometers each having an adjustable element, and a slidable master shaft assembly, including a master shaft for selectively adjusting said elements, said control assembly comprising:

frame means for supporting said potentiometers with said adjustable elements arranged in a line, and defining a corresponding plurality of separate tuning positions for adjustment of said potentiometers;

guide means permitting movement of said master shaft assembly to said tuning positions;

means normally biasing said master shaft out of engagement with said adjustable elements; and means for mechanically coupling said master shaft to the selected one of said adjustable elements for adjustment of its corresponding potentiometers.

2. A television receiver as in claim 1, wherein said control assembly includes:

positioning means at each tuning position; and coacting means on said master shaft, said positioning means and said coacting means cooperating to facilitate engagement between said master shaft and said adjustable elements.

3. A television receiver as in claim 2, further including detent means indexing said master shaft assembly at said tuning positions, wherein said positioning means includes a plate, mounted on said frame means, interposed between said master and said adjustable elements, defining a plurality of chamfered holes corresponding to said adjustable elements, said chamfers defining cam surfaces; and said coacting means including a cam follower on said master shaft contacting said cam surfaces, in the event of said alignment errors, and guiding said master shaft into engagement with said adjustable elements.

4. A television receiver as in claim 3, wherein said guide means includes;

a track, mounted to said frame, positioned along said linear arrangement of controls and having depressions adjacent said holes; and a track follower, on said master shaft assembly, cooperating with said track to restrict said assembly to movement along said linear arrangement of said tuning positions.

5. A television receiver as in claim 4, wherein said detent means includes;

a spring loaded ball on said master shaft assembly cooperating with said depressions to index said master shaft assembly at said tuning positions.

6. A television receiver as in claim 5, wherein said master shaft assembly includes means permitting axial movement of said master shaft into engagement with said adjustable elements, and wherein said means normally biasing said master shaft include a spring, housed in said master shaft assembly, urging said master shaft out of engagement with said adjustable elements;

said means for mechanically coupling said master shaft to said adjustable elements including gear-like end structures on said master shaft and said adjustable elements.

7. A television receiver as in claim 2, wherein said positioning means includes;

a plate, mounted on said frame means, interposed between said master shaft and said adjustable elements, defining a plurality of holes corresponding to said adjustable elements, and a plurality of cam surfaces adjacent said holes, said coacting means including a cam follower, on said master shaft, contacting said cam surfaces and guiding said master shaft into engagement with said adjustable elements.

8. A television receiver as in claim 7, wherein said plate includes a plurality of valleys each having one of said holes formed in the bottom thereof; said cam surfaces being defined by the walls of said valleys, the width of said valleys defining the region in which said alignment can occur.

9. A television receiver as in claim 8, wherein said guide means includes;

a track on said frame means, and a track follower, on said master shaft assembly, cooperating with said track to restrict said assembly to movement along said linear arrangement of said tuning positions.

10. A television receiver as in claim 9, wherein said master shaft assembly includes means permitting axial movement of said master shaft into engagement with said adjustable elements, said means normally biasing said master shaft including a spring, housed in said master shaft assembly, urging said master shaft out of engagement with said adjustable elements, and said means for mechanically coupling said master shaft to said adjustable elements including gear-like end structures on said master shaft and said adjustable elements.

11. A television receiver, having a control assembly including a plurality of viewer operable controls, each having an adjustable element, said control assembly comprising:

a frame supporting said controls with said adjustable elements arranged in a line, and defining a corresponding plurality of separate tuning positions for adjustment of said controls;

a master shaft assembly having a track follower;

a master shaft, carried by said master shaft assembly, movable into engagement with said adjustable element;

a plate, interposed between said master shaft assembly and said controls, defining a plurality of chamfered holes corresponding to said adjustable elements, said adjustable elements accessible to said master shaft through said holes;

a track, mounted on said frame, positioned along said linear arrangement of controls and having depressions adjacent said holes, said master shaft assembly track follower coacting with said track, permitting said master shaft assembly to move to said tuning positions;

spring means, urging said master shaft out of said engagement;

a spring loaded ball, on said master shaft assembly, cooperating with said depressions to index said master shaft assembly at said tuning position;

said master shaft and said adjustable elements having gear-like end structures to facilitate engagement therebetween;

said master shaft end structure coacting with said chamfers to facilitate said engagement in the event of minor misalignment between said master shaft and said adjustable elements; and indicator means cooperating with said master shaft assembly to indicate to the viewer the control function operable in a given master shaft assembly position.

12. A television receiver as in claim 11, wherein said control assembly further includes resilient closure means, mounted on said frame, having an elongated aperture, through which said master shaft protrudes, said resilient closure means acting to mask said control assembly.

* * * * *